June 1, 1954
O. BHEND
2,679,911
SUPPORT FOR POLES AND THE LIKE
Filed Aug. 13, 1948
2 Sheets-Sheet 1
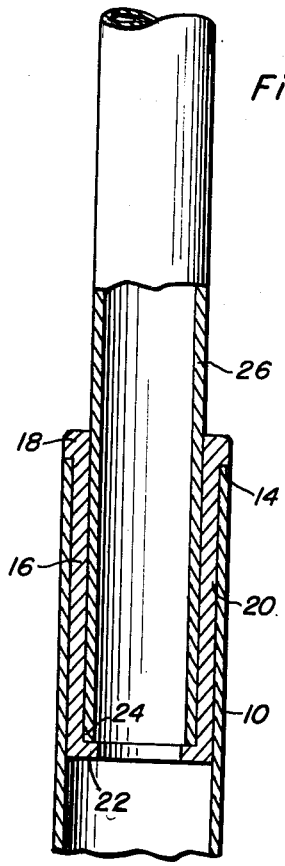
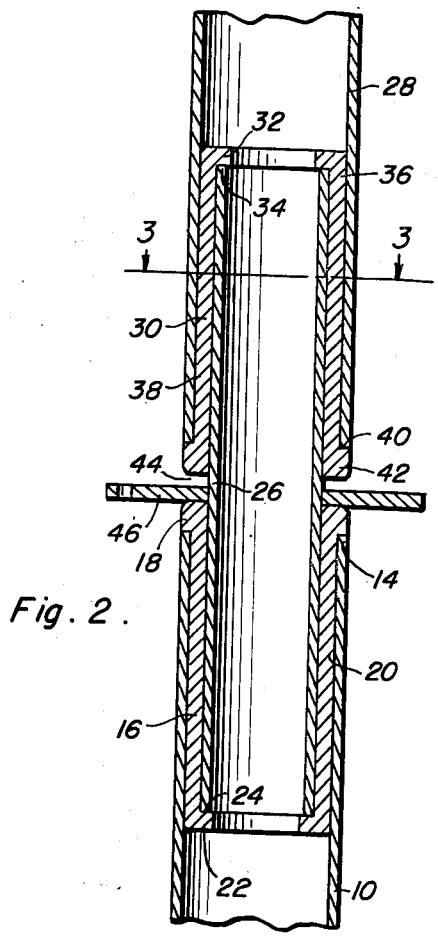
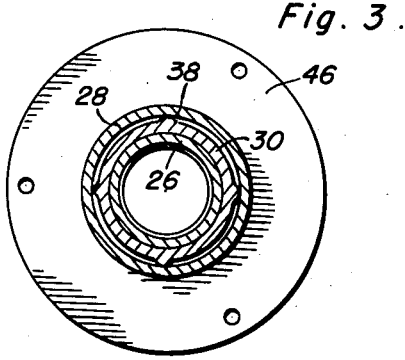
Otto Bhend
INVENTOR.
BY *Clarence A. O'Brien*
*and Harvey B. Jacobson*
Attorneys June 1, 1954  O. BHEND  2,679,911
SUPPORT FOR POLES AND THE LIKE
Filed Aug. 13, 1948
2 Sheets-Sheet 2
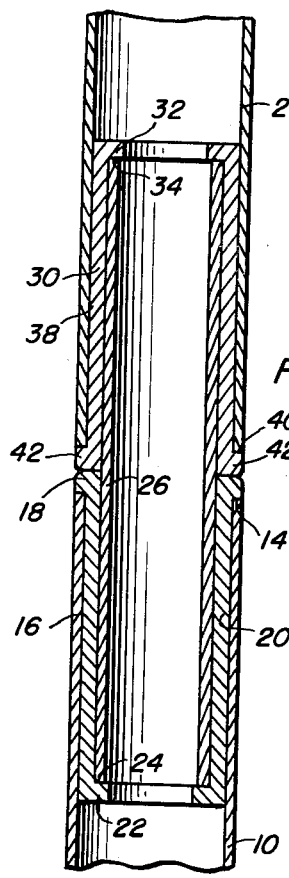
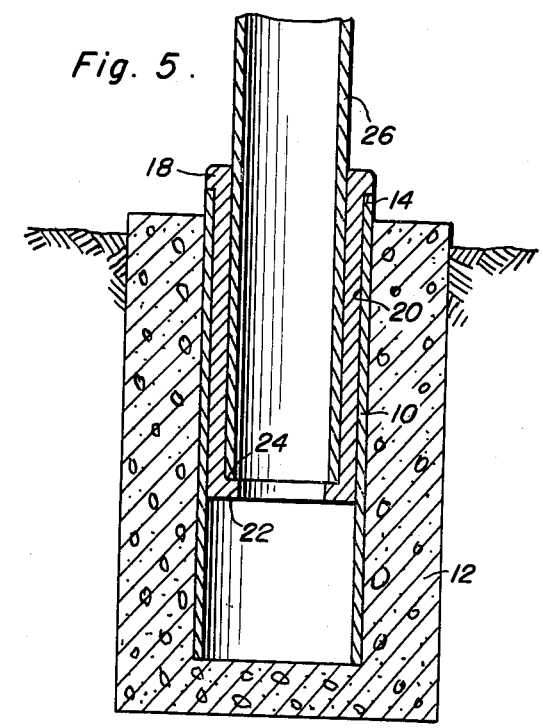
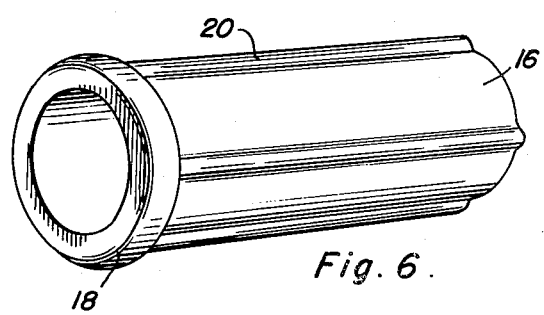
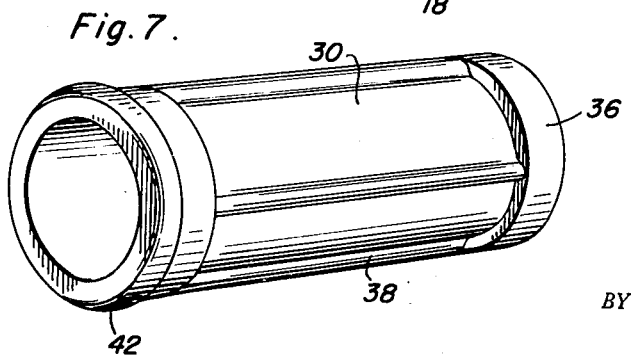
Otto Bhend
INVENTOR.

Patented June 1, 1954

2,679,911

UNITED STATES PATENT OFFICE 2,679,911

SUPPORT FOR POLES AND THE LIKE

Otto Bhend, Pasadena, Calif., by decree of distribution, to Louise J. B'hend

Application August 13, 1948, Serial No. 44,022

3 Claims. (Cl. 189—26)

The invention relates to new and useful improvements in supports and the primary object of the present invention is to provide a novel and improved support for uprights such as aerial poles that will permit the said poles to be quickly and readily rotated to a selected position for the purpose of "tuning in" television reception in a convenient and efficient manner.

Another important object of the present invention is to provide a coupling that will make a strong and rigid connection between an anchoring element and an upright such as pipes or tubing for outdoor lighting poles, television pole aerials and the like.

A further object of the present invention is to provide an anchoring tube that is fixed to a structural element, a bearing insertable within the anchoring tube that will rotatably support an upright, and embodying novel and improved means for locking the bearing to the anchoring tube and against rotary movement thereto.

A still further aim of the present invention is to provide a support for posts, poles and the like of the aforementioned character that is simple and practical in construction, strong and reliable in use, small and compact in structure, neat and attractive in appearance, relatively inexpensive to manufacture, and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 1 is a side elevational partly in section view of the present invention showing the same applied to an anchoring member and supporting a cylinder or upright;

Figure 2 is a fragmentary longitudinal vertical sectional view of the present invention for supporting an upright or cylinder of relatively large diameter, and showing a guy wire engaging plate applied thereto;

Figure 3 is a transverse horizontal sectional view taken substantially on the plane of section line 3—3 of Figure 2;

Figure 4 is a view similar to Figure 2 and showing the guy wire engaging plate removed therefrom;

Figure 5 is a view similar to Figure 1 and showing the anchoring member embedded in a concrete footing;

Figure 6 is a perspective view of the bearing element used in conjunction with the present invention for uprights of relatively small diameter; and, Figure 7 is a perspective view of the bearing element used in conjunction with the present invention for uprights having relatively large diameters.

Referring now to the drawings in detail, wherein for the purpose of illustration, there is disclosed a preferred embodiment of the present invention, the numeral 10 represents a tubular anchoring member that is suitably fixed to a supporting structural element or embedded in a concrete footing 12.

Inserted into the upper open end 14 of the anchoring member 10 is a bearing sleeve 16 having an annular flange or bearing shoulder 18 at its upper end that bears against the upper end 14 of the anchoring member 10 to limit inward sliding movement of the bearing sleeve 16 relative to the anchoring member 10.

Integrally formed with the outer periphery of the bearing sleeve 16 is a plurality of circumferentially spaced, longitudinal ribs or locking members 20 that bear against the inner periphery of the anchoring member 10 to prevent rotation of the bearing sleeve 16 relative to the anchoring member 10.

An annular bearing shoulder 22 is integrally formed with the inner periphery of the bearing sleeve 16 at the inner end thereof and forms a support for the lower or inner end 24 of a cylinder 26 that is preferably hollow throughout its length.

In the above form, as shown best in Figures 1, 5 and 6 of the drawings, the cylinder 26 assumes the form of a post or pole for wires, conductive elements or the like, and the cylinder 26 is relatively small in diameter or cross section. Obviously, the cylinder 26 may be rotated in the bearing to any desired position in a convenient manner.

For use of the present invention in supporting uprights, tubes, pipes or the like 28 having a diameter greater than the cylinder 26, and as illustrated best in Figures 2, 3, 4 and 7, an upper bearing sleeve 30 embraces the upper end of the cylinder 26.

An annular shoulder 32 is provided on the inner wall of the upper sleeve 30 at the upper end thereof and bears against the upper end 34 of the cylinder 26 and the upper end of the sleeve 30 is reinforced by an annular flange 36 the outer surface of which is flush with the outer surfaces of a plurality of circumferentially spaced, longitudinal bearing ribs 38 that project from the outer surface of the upper sleeve 30.

The tube 28 embraces the upper sleeve 30 and the lower end 40 thereof is supported on an annular flange 42 at the lower end of the upper sleeve. The inner wall of the tube 28 is frictionally locked to the ribs 38 whereby the bearing sleeve 30 and tube 28 will rotate together, and the flange 42 will bear against the flange 18 of the sleeve 16, see Figure 4.

When it is desirable to further brace or support the tube 28 and the elements supporting the same, the length of the cylinder 26 is increased so that there will be a space 44 between the flanges 18 and 42, and an apertured guy wire receiving ring 46, slidable on the cylinder 26, is disposed between the flanges 18 and 42 and bears upon the flange 18, as shown best in Figure 2 of the drawings.

In view of the foregoing description taken in conjunction with the accompanying drawings it is believed that a clear understanding of the device will be quite apparent to those skilled in this art. A more detailed description is accordingly deemed unnecessary.

It is to be understood, however, that even though there is herein shown and described a preferred embodiment of the invention the same is susceptible to certain changes fully comprehended by the spirit of the invention as herein described and the scope of the appended claims.

Having described the invention, what is claimed as new is:

1. A support for uprights comprising a tubular anchoring member, a bearing sleeve received in said anchoring member, said bearing sleeve including a continuous flanged portion bearing against one end of said anchoring member and limiting inward movement of said bearing sleeve relative to said anchoring member, means on the outer periphery of said bearing sleeve retaining the bearing sleeve within said anchoring member and against rotary movement thereto, a supporting cylinder having one end engaged in said bearing sleeve for rotation, means carried by said bearing sleeve supporting one end of said cylinder, and means carried by said cylinder adapted to be engaged by a plurality of guy wires, said anchoring member being of uniform thickness throughout its circumference, an upper bearing sleeve embracing the upper end of said cylinder, means carried by said upper sleeve supporting the same relative to said cylinder, an upstanding tube embracing said upper sleeve, means carried by said upper sleeve supported on one end of said tube, and means detachably securing said upper sleeve to said tube for rotation therewith.

2. The combination of claim 1 wherein said means carried by the upper sleeve supporting the same relative to said cylinder includes an internal shoulder on the inner wall of said upper sleeve.

3. A support for uprights comprising a tubular anchoring member, a first sleeve received in said anchoring member and having upper and lower ends, an external flange at the upper end of said first sleeve supported upon the upper end of said anchoring member, an internal flange at the lower end of said first sleeve, a cylinder having upper and lower ends, the lower end of said cylinder being received in said first sleeve and supported upon the internal flange, a second sleeve receiving the upper end of said cylinder, said second sleeve having an upper internal flange and a lower external flange, the internal flange of said second sleeve being supported on the upper end of said cylinder, a hollow upright receiving said second sleeve and having a lower end supported upon the external flange of said second sleeve, locking ribs on the outer periphery of each sleeve, the locking ribs on said first sleeve wedgingly contacting the inner periphery of said anchor member and the locking ribs on the second sleeve wedgingly contacting the inner periphery of said hollow upright.

References Cited in the file of this patent
UNITED STATES PATENTS

| Number | Name | Date |
| --- | --- | --- |
| 377,953 | Mills | Feb. 14, 1888 |
| 421,532 | Van Dorn | Feb. 18, 1890 |
| 494,615 | Ziegler | Apr. 4, 1893 |
| 922,400 | De Groot | May 18, 1909 |
| 1,188,485 | Pruyn | June 29, 1916 |
| 1,391,456 | Broschart | Sept. 20, 1921 |
| 1,945,279 | Kraner | Jan. 30, 1934 |
| 2,120,806 | Keuffel | June 14, 1938 |
| 2,277,436 | Howle | Mar. 24, 1942 |
| 2,410,246 | Schrivener et al. | Oct. 29, 1946 |